J. PICKLE.
Earth-Augers.
No. 157,540. Patented Dec. 8, 1874.
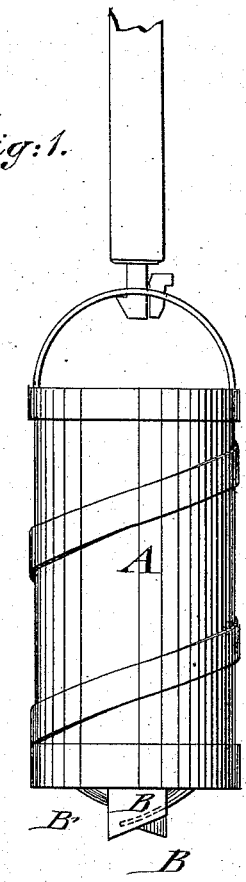
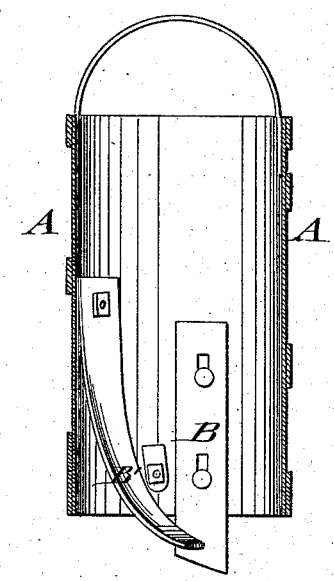
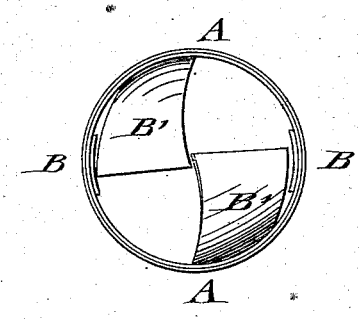
WITNESSES:
Chas. Nida.
A. F. Terry
INVENTOR:
J. Pickle
BY Munn & Co.
ATTORNEYS.

UNITED STATES PATENT OFFICE.

JOHN PICKLE, OF KOSCIUSKO, MISSISSIPPI.

IMPROVEMENT IN EARTH-AUGERS.

Specification forming part of Letters Patent No. 157,540, dated December 8, 1874; application filed October 24, 1874.

*To all whom it may concern:*

Be it known that I, JOHN PICKLE, of Kosciusko, Attala county, Mississippi, have invented a new and Improved Earth-Auger, of which the following is a specification:

In the drawing, Figure 1 represents a side elevation of my improved earth-auger; Fig. 2, a vertical central section, and Fig. 3 a bottom view, of the same.

Similar letters of reference indicate corresponding parts.

My invention relates to a simple and effective earth-borer, that cuts and lifts the earth readily from the bore-hole; and it consists of a hollow cylindrical body or drum, provided at its inner circumference with projecting and adjustable side-cutting blades, together with intermediate blades twisted toward the center, to form a diametrical connection with the side cutters for cutting and lifting.

In the drawing, A represents the cylindrical body or drum of my improved auger, which is made of sheet metal, of suitable strength and size, with stiffening top and bottom bands, and a spiral strengthening-band for guiding the drum steadily in its turning motion in the bore-hole. The drum A is connected by a strong top bail, in any approved manner, with the auger-shaft, and provided at the interior lower part with four adjustable cutting-blades, B B', of which two are placed at diametrically-opposite points of the circumference, tapering vertically into the ground while the other two are placed intermediately between the side blades, and twisted in a spiral curve toward the center of the drum, in such a manner that they pass each other in opposite direction, and form a radial connection with the side blades, as shown in Fig. 3.

The side edge of the intermediate twisted blades runs slightly above the lower inclined side-cutting blades, producing, on entering the ground, the cutting and guiding action of the side blades along the circumference of the bore-hole, while the intermediate blades serve the double function of cutting spirally into the earth, and retaining, also, the earth collected above the blades, so that the drum, when filled up, may be hoisted from the bore-hole, and the earth be lifted out therewith, the broader ends of the twisted blades acting as a kind of a basket-support thereto.

The blades are adjusted at the inside of the drum, to project at greater or less depth beyond the bottom edge of the same, by guide-slots and clamp-screws, in the usual manner, producing thus a cheap and very effective auger for ordinary boring purposes.

Having thus described my invention, I claim as new and desire to secure by Letters Patent—

The earth-auger herein described, constructed of outer cylindrical body or guide-drum A, with interior adjustable and vertical side-cutting blades B, and twisted radially-connecting lifting-cutters B', substantially in the manner and for the purpose set forth.

JOHN PICKLE.

Witnesses:
 W. H. JENKINS,
 RICHD. G. GAUTE.